United States Patent [11] 3,599,537

| [72] | Inventors | Charles Phillip Smith<br>Wolverhampton;<br>Stanley George Glaze, Brierley Hill; John<br>Roger Wynne, Wolverhampton, all of,<br>England |
|---|---|---|
| [21] | Appl. No. | 875,936 |
| [22] | Filed | Nov. 12, 1969 |
| [45] | Patented | Aug. 17, 1971 |
| [73] | Assignee | H. M. Hobson Limited<br>London, England |
| [32] | Priority | Nov. 12, 1968 |
| [33] | | Great Britain |
| [31] | | 53598 |

[54] CONSTANT SPEED DRIVE
2 Claims, 1 Drawing Fig.

[52] U.S. Cl.................................................. 91/506,
417/282
[51] Int. Cl..................................................... F04b 1/02,
F04b 49/00
[50] Field of Search............................................ 91/506;
417/222, 294, 540; 92/12, 2

[56] References Cited
UNITED STATES PATENTS

| 2,803,112 | 8/1957 | Sadler et al. | 91/506 |
| 2,931,177 | 4/1960 | Teumer | 417/222 |
| 3,136,264 | 6/1964 | Wahlmark | 91/506 |
| 3,139,006 | 6/1964 | Budzich | 91/506 |
| 3,170,450 | 2/1965 | Kent et al. | 417/222 |
| 3,354,978 | 11/1967 | Budzich | 417/222 |

FOREIGN PATENTS

| 169,880 | 10/1921 | Great Britain | 417/222 |

*Primary Examiner*—William L. Freeh
*Assistant Examiner*—John J. Vrablik
*Attorney*—E. T. LeGates ABSTRACT: The invention provides mechanism for driving a load at constant speed, comprising a hydraulic pump which develops a substantially constant delivery pressure, a variable displacement hydraulic motor driven by liquid supplied by the pump and having an output shaft arranged to drive the load and means sensitive both to the speed and to the rate of change of speed of the output shaft for adjusting delivery control mechanism of the motor to maintain the output shaft at a constant speed.

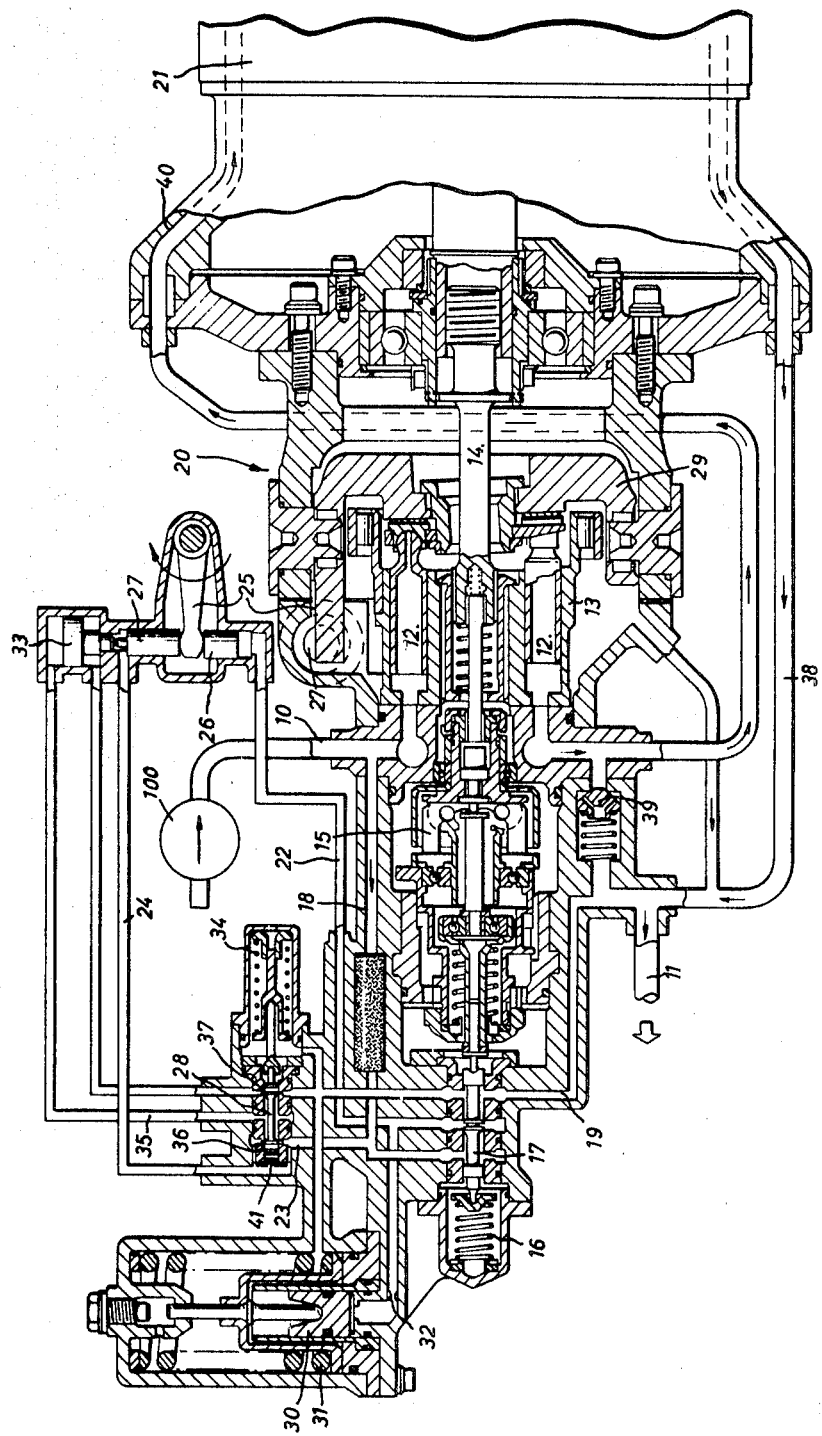

CONSTANT SPEED DRIVE

This invention provides mechanism for driving an alternator or other load at constant speed, comprising a hydraulic pump which develops a substantially constant delivery pressure, a variable displacement hydraulic motor driven by liquid supplied by the pump and having an output shaft arranged to drive the load, and means sensitive both to the speed and to the rate of change of speed of the output shaft for adjusting delivery control mechanism of the motor to maintain the output shaft at a constant speed.

An embodiment of the invention as applied to a constant speed hydraulic drive for an alternator in an aircraft is illustrated in the accompanying drawing.

A hydraulic supply pump 100 supplies liquid at substantially constant supply pressure across the inlet and return terminals 10, 11 of a variable delivery hydraulic motor 20, the pistons 12 of which are mounted in a rotary cylinder barrel 13 which drives an output shaft 14 coupled to an alternator 21 at a speed determined by the angularity of a swashplate 29.

A flyweight governor 15 responsive to changes in speed of the output shaft 14 of the motor 20 and operating against the action of a spring 16 is coupled to a servovalve 17 which controls communication between a pressure line 18 and a return line 19 and a line 22.

The angularity of the swashplate 29 of the motor 20 is controlled by a lever 25 interposed between a pair of servo pistons 26 and 27; the underside of the piston 26 being subject to the pressure in the line 22 and therefore dependent upon the position of the servovalve 17. The upper end of the piston 27 is subject to pump delivery pressure through a line 23, 24 which bypasses a valve 28 through passages in its valve guide.

The motor 20, since it operates on a nominally constant supply pressure, develops in its output shaft 14 a torque proportional to its volumetric displacement, and therefore to the angularity of the swashplate 29, and delivers this torque to the alternator 21. An increase in the electrical load on the alternator 21 causes the motor 20 to slow down due to the deficiency in driving torque. In response, the governor 15 displaces the servovalve 17 to increase the pressure in the line 22 and move the lever 25 clockwise, as indicated by the arrow, to adjust the swashplate 29 to increase the speed of the motor 20.

To prevent development of an oscillatory condition, the system includes a stabilizing piston 30, loaded by a spring 31. Part of the flow provided by movement of the servovalve 17 is applied, via a restrictor 32, to the underside of the stabilizing piston 30. Movement of the servovalve 17 in response to a speed error therefore involves variation in the hydraulic pressure applied to the undersurface of the stabilizing piston 30 and the adjustment of the swashplate 29 is therefore dependent not only on change in speed of the alternator 21 but also on rate of change of speed of the alternator 21. The rate of flow of liquid through the valve 17 depends upon the extent of opening of the valve and therefore upon the speed error, i.e. the difference between the actual speed of the output shaft 14 and its required speed. In the absence of the stabilizing piston 30, the movement of the piston 26 and therefore the adjustment of the swashplate 29 would be dependent solely upon the speed error. Since, however, in the event of a flow through the valve 17 from the inlet 10 to increase the speed of the motor 20, the total flow through the valve 17 is split, some only of the liquid serving to displace the piston 26 and some flowing through the restrictor 32 to displace the piston 30, the adjustment of the swashplate is less and hunting in the system is avoided. Likewise, when the valve 17 moves in the opposite direction to reduce the speed of the motor 20, part of the flow through the valve 17 to the return terminal 11 is derived from the piston 30 so that the adjustment of the swashplate by the piston 26 is again reduced. It can be shown mathematically that the effect of the restrictor 32 and piston 30 is to render the adjustment of the swashplate 29 dependent not only upon the speed error but also upon the rate of change of the speed error.

When starting up, the swashplate 29 will occupy a position demanding maximum volumetric displacement of the motor 20 and under these conditions the flow from the pump would be insufficient to meet the requirements of the motor. This is prevented by the valve 28 and a swash limiter piston 33 which ensure that when the pressure drop $\Delta P$ across the motor terminals 10, 11 falls below a predetermined limit the rate of fluid flow demanded by the hydraulic motor 20 never exceeds a predetermined proportion of the maximum flow demand.

In the steady state condition $\Delta P$ acts across the valve 28, which is subject at its left end to inlet pressure applied by the line 24 and at its right-hand end to the pressure of a spring 34. When $\Delta P$ falls to a value less than, say 2,800 p.s.i., a spring 34 moves the valve 28 to the left to apply fluid at supply pressure through a line 35 to the upper end of the swash limiter piston 33. The upper face of the piston 33 has a larger area than the piston 27 and when supply pressure is applied to the upper face of the piston 33 in opposition to the pressure acting on the lower face of the piston 26, a limit is placed on the angle to which the swashplate 29 can be set by the piston 26.

For values of $\Delta P$ greater than 2,800 p.s.i. there is sufficient hydraulic force on the valve 28 to overcome the spring 34 and the valve 28 assumes a position in which the pressure in the line 35 falls to exhaust pressure as the result of closure of a supply port 36 and opening of an exhaust port 37. The swashplate 29 can then be moved to its maximum angularity, when required, under control of the governor 15 and the stabilizing piston 30.

A stabilizing orifice 41 is provided to prevent the valve 28 from being unduly responsive to rapid pressure fluctuations.

The exhaust flow from the motor 20 is passed through a pipe 40 to cooling galleries in the alternator 21 and returned through a pipe 38 to the outlet 11. A bypass valve 39 provides a predetermined pressure difference, e.g. of 50 p.s.i., across the alternator which provides for sufficient cooling flow.

What we claim as our invention and desire to secure by Letters Patent is:

1. Mechanism for driving a load at constant speed, comprising a hydraulic pump which develops a substantially constant delivery pressure, a variable displacement hydraulic motor driven by liquid supplied by the pump and including a swashplate which is angularly adjustable to vary the displacement of the motor and an output shaft arranged to drive the load, a servo piston operative to vary the angle of the swashplate in accordance with a variable hydraulic pressure applied to the servo piston through a pressure line, a governor responsive to change in speed of the output shaft, a servovalve operable by the governor to connect said pressure line to a pressure inlet or to a return outlet in response respectively to decrease and increase of the speed of the output shaft from a determined value to adjust the hydraulic pressure applied to the servo piston, and a spring-loaded stabilizing piston subject, through a restrictor, to the hydraulic pressure in said pressure line and arranged to receive part of the flow through said servovalve upon movement of the servovalve to connect the pressure line to the inlet and to contribute part of the flow through said servovalve upon movement of the servovalve to connect the pressure line to the return outlet.

2. Mechanism as claimed in claim 1, which includes a normally inoperative swash limiter piston for limiting the angularity which can be imparted to the swashplate by the servo piston, and a valve which is subject to the hydraulic pressure difference across the hydraulic motor and movable, when said pressure difference falls below a predetermined value, to apply pressure to the swash limiter piston and so render it effective to limit the angular adjustment of the swashplate.

UNITED STATES PATENT OFFICE
Certificate of Correction

Patent No. 3,599,537                                          August 17, 1971

Charles Phillip Smith et al.

It is certified that error appears in the above-identified patent and that said Letters Patent are hereby corrected as shown below.

On the cover sheet the illustrative drawing should appear as shown below:

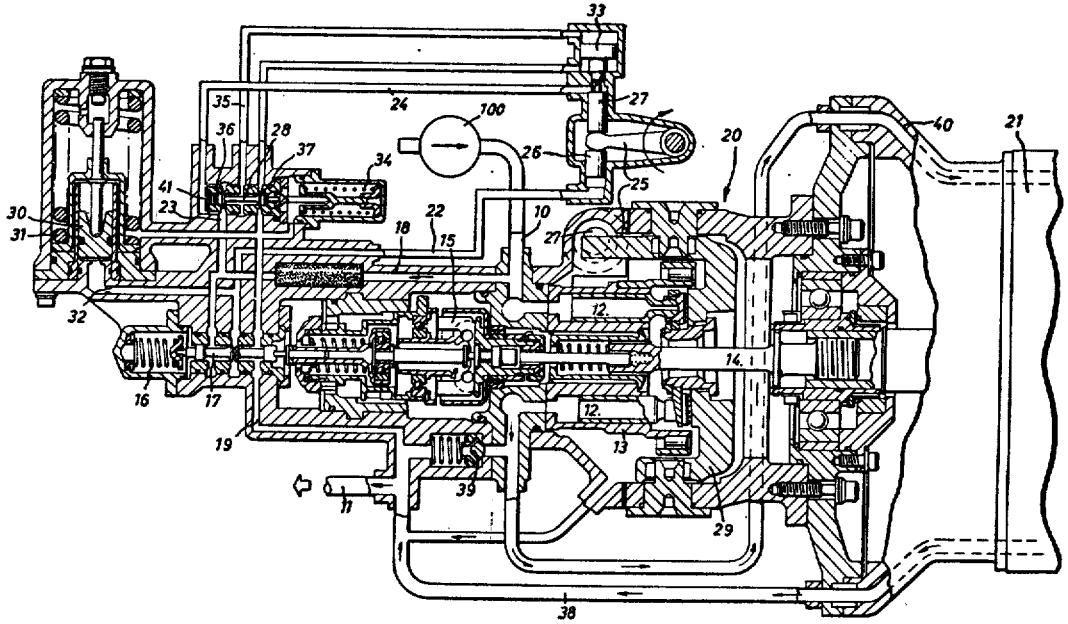

Signed and sealed this 25th day of July 1972.

[SEAL]
Attest:
EDWARD M. FLETCHER, JR.,
*Attesting Officer.*

ROBERT GOTTSCHALK,
*Commissioner of Patents.*